US009660753B2

(12) United States Patent
Lin et al.

(10) Patent No.: US 9,660,753 B2
(45) Date of Patent: May 23, 2017

(54) OPTICAL ADD/DROP MULTIPLEXER USING INTEGRATED OPTICAL COMPONENTS

(75) Inventors: Philip J. Lin, Newton, MA (US); James D. Mills, Wilmington, MA (US)

(73) Assignee: Tellabs Operations, Inc., Naperville, IL (US)

( * ) Notice: Subject to any disclaimer, the term of this patent is extended or adjusted under 35 U.S.C. 154(b) by 851 days.

(21) Appl. No.: 13/300,130

(22) Filed: Nov. 18, 2011

(65) Prior Publication Data

US 2012/0063778 A1 Mar. 15, 2012

Related U.S. Application Data

(62) Division of application No. 10/144,674, filed on May 13, 2002, now Pat. No. 8,095,007.

(60) Provisional application No. 60/291,506, filed on May 16, 2001.

(51) Int. Cl.
*H04J 14/02* (2006.01)

(52) U.S. Cl.
CPC ...... *H04J 14/0213* (2013.01); *H04J 14/0212* (2013.01); *H04J 14/0217* (2013.01)

(58) Field of Classification Search
CPC . H04J 14/0213; H04J 14/0212; H04J 14/0217
USPC ................................................ 398/68, 83–85
See application file for complete search history.

(56) References Cited

U.S. PATENT DOCUMENTS 4,909,584 A * 3/1990 Imoto et al. .................... 385/24
5,926,590 A * 7/1999 Mao ................................ 385/24
6,407,839 B1 * 6/2002 Cao .................................. 398/9
6,567,429 B1 * 5/2003 DeMartino .................. 370/539
6,944,404 B2 * 9/2005 Lange .................... H04J 14/02 398/135
2002/0171897 A1 * 11/2002 Cho et al. .................... 359/172
2007/0122148 A1 * 5/2007 Welch .................... B82Y 20/00 398/27

* cited by examiner

*Primary Examiner* — Leslie Pascal
(74) *Attorney, Agent, or Firm* — Husch Blackwell LLP

(57) ABSTRACT

An optical add/drop multiplexer incorporates an integrated receiver module and an integrated transmitter which are interfaced to an intervening electrical network to provide an add/drop/pass-through functionality. The receiver module incorporates a wavelength demultiplexer which is in turn combined with optical/electrical converters PIN photodiodes, and amplifiers on a per wavelength basis to output a plurality of parallel electrical signals in response to a common optical input. The transmitter module combines an integrated plurality of drive circuits and lasers for converting a plurality of parallel input electrical signals to a plurality of optical signals, on a per wavelength basis, which in turn are coupled via an optical wavelength multiplexer to a common output optical fiber. The interconnected electrical network, ring mesh or tree, can provide a reconfigurable electrical add/drop interface to other portions of the network.

8 Claims, 5 Drawing Sheets

14a
14a-1
24-1
26-1
14b-1
30'
38"
RCVR
TRANS
28'
14b
TRANS
RCVR
38'
30'
26-1
24-1

26
26a
26b
38
MUX
44
36c
36b-1
λ1
λ2
λ3
λ4
λ5
λ6
λ7
λl
36b
DRIVER CIRCUITRY, 36a
36a-1
36a-l
e1,I
el,I
ELECTRICAL I/O 24
32
ELECTRICAL I/O
e1,O
en,O
30e
30d
30e-i
30e-n
λ1
λ2
λ3
λ4
λi
λ6
λ7
λn
RECEIVER ELECTRONICS
30c
30c-i
30b
30a
42
DEMUX
24a
24b
30

14a
80
28'
14b
14b
14a
82a
82b
14a
28'
TREE
14b
14b
14b
14b
82c
82d
82n
14a 90
14a
90a
28'
28'
90b
14b
14a
14b
MESH
28'
28'
90c
90d 120
130a
130b
130c
130d
130e
ADD/DROP
ADD/DROP
28
110a
110b
110c
110d
110c'
110c'
110c"
110c"
124a
124b
124c
126a
126b
126c 100
102
OLT
ONU
ONU
ONU
ONU
104a
104b
104c
104d
110a
110b
110c
110c'
110c'
110d
110e
110f
110c"
110c"
114a
114b

OPTICAL ADD/DROP MULTIPLEXER USING INTEGRATED OPTICAL COMPONENTS

CROSS-REFERENCE TO RELATED APPLICATION

This application is a divisional of parent U.S. patent application filed May 13, 2002 as application Ser. No. 10/144,674 and claims the benefit of the filing date thereof. The benefit of the filing date of Provisional Patent Application Ser. No. 60/291,506, filed May 16, 2001 is also hereby claimed.

FIELD OF THE INVENTION

The present invention relates to the field of optical networking. More specifically, the present invention relates to integrated optical add/drop multiplexers.

BACKGROUND OF THE INVENTION

In known optical communications systems, optical/electrical interfaces are created at nodes. In known Wave Division Multiplexing (WDM) Systems modulated information carrying light beams of selected wavelengths transmitted on a common fiber, can be added/dropped while others are passed-through at each node using such interfaces.

The interfaces need to accommodate a variety of rates and data formats (transparency) and be remotely configurable. One such interface is an optical add/drop multiplexer. Such multiplexers find application in optical networks of the type disclosed in U.S. Pat. No. 6,301,254B1, Virtual Path Ring Protection Method and Apparatus. The '254 patent is assigned to the assignee hereof and is incorporated by reference.

Known multiplexers are often formed of discrete components which require numerous connections. They are expensive to fabricate and can present quality control and reliability issues. Many of these systems are not remotely configurable. Others utilize 3R regeneration (re-amplify, re-shape, re-time) which requires prior knowledge of the data format of the traffic, and, which results in loss of transparency.

There continues to be a need for more cost effective add/drop multiplexers which also exhibit improved reliability. Preferably such multiplexers could be used in a variety of network configurations. It would also be preferable if bit-rate transparency could be maintained in the optical paths.

DETAILED DESCRIPTION

Figure 1:
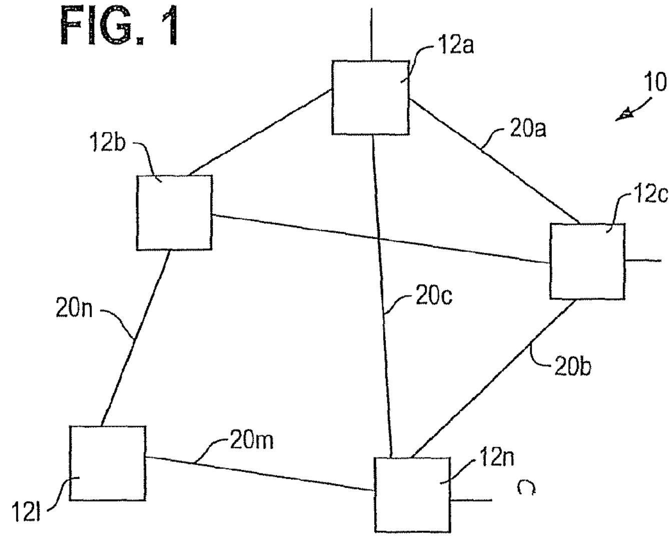
FIG. 1 illustrates a portion of an exemplary network in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Integrated optical component design and manufacturing techniques where multiple device functions are integrated onto a single device can be used to implement cost-effective add/drop multiplexers. Each integrated device replaces many discrete components. This leads to fewer spare parts and reduced manufacturing cost for the multiplexers. This approach reduces over-all system component cost because a large portion of the cost for such devices is typically associated with device packaging and fiber connections to the device. A crosspoint switch can be combined with the integrated devices at the respective nodes to provide remote configurability of the respective multiplexer and the network.

The multiplexers perform optical-electrical-optical conversions (through the use of transponder like regeneration) for all wavelengths including the pass-through wavelengths. The process regenerates all light paths at each multiplexer, on a per path basis, and eliminates the need for complicated link budget calculation and span engineering rules. The span engineering rules are required for some known versions of multiplexers that have optical pass-through.

The per path or wavelength regeneration allows for addition-deletion of nodes in the network without affecting the power budget of existing nodes. The conversion also permits wavelength switching to avoid stranded bandwidth, which is a problem for non-wavelength switching systems.

The multiplexers can be incorporated in ring networks. Protection schemes are allowed in this implementation.

A plurality of these integrated devices can be combined with a crosspoint switch to create larger degree nodes. In one embodiment, tree networks and mesh networks can be created. Such a tree network would correspond to a WDM version of a Passive Optical Network.

2R regeneration (re-amplify, re-shape) can be incorporated into respective devices without re-clocking (re-time) instead of 3R regeneration which requires clock recovery. 2R regeneration supports bit-rate transparency and permits each wavelength to operate at different bit-rates. This type of process was disclosed in Green, Jr. U.S. Pat. No. 5,483,372, now assigned to the assignee hereof.

In one disclosed embodiment, an integrated, arrayed, transmitter chip incorporates a plurality of K mono-chromatic sources, lasers, each operating at a different WDM wavelength, in combination with an integrated wavelength multiplexer on a common substrate. This chip has one fiber interface as compared to the discrete version which has 2K+1 fiber interfaces (one for each transmitter and K+1 for the multiplexer). An arrayed transmitter chip can be expected to be less costly than its discrete equivalent.

An arrayed receiver chip combines an integrated plurality of detectors with integrated waveguides coupled to an integrated wavelength demultiplexer on a common substrate. This chip can also be expected to be less expensive than the discrete counterpart. A plurality of transimpedance amplifiers and series coupled limiting amplifiers can also be integrated into the chip in order to 2R regenerate (reamplify, reshape) all received signals on a per wavelength (per lambda) basis.

According to another disclosed embodiment, a plurality of these chips are incorporated in an optical communication system. A crosspoint switch can be located between a receiver chip and a transmitter to add/drop or switch specific channels. The integrated chips reduce system cost while the crosspoint switch provides remote provisioning of light paths.

In the transmitter integrated lasers are provided on a per path or wavelength basis as optical sources. Laser drive electronics can also be integrated into the transmitter chip.

FIG. 1 illustrates a portion of an exemplary mesh network 10 that contains multiple electrical add/drop nodes 12*a, b*-n. These can, but need not, be substantially identical. Each add/drop module has fiber interfaces that accept and transmit WDM traffic via optical fibers 20*a, b, n*. One or more WDM channels can be added or dropped. Once dropped, the electrical signal can be retimed. At the intermediate add/drops, "through" traffic is not retimed. 2R reamplification and reshaping is provided thereby preserving bit rate transparency.

Each add/drop node includes wavelength multiplexers and demultiplexers to combine and separate the wavelength channels. Photodiode receivers for example PIN photodiodes, and directly modulated laser transmitters electrically regenerate received signals and then convert them back to an optical format. A crosspoint switch can be used to add and drop traffic.

Figure 2A:
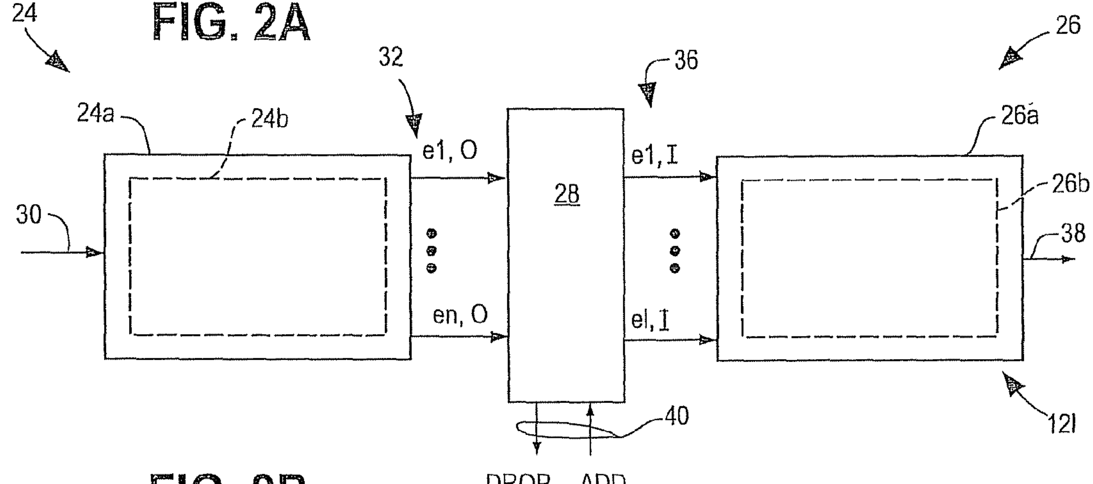
FIG. 2A illustrates an add/drop multiplexer in accordance with the present invention.

FIG. 2A illustrates details of a representative add/drop module, such as module 121. Module 121 includes an integrated opto/electrical circuit receiver module 24, an integrated electrical/optical circuit transmitter module 26 and an electrical switching fabric, which could be implemented as a crosspoint switch, 28. Receiver module 24 is contained in a housing 24*a* and provides an optical input interface for an optical fiber 30 which might carry, for example, a WDM optical input signal, and a plurality of wavelength demultiplexed electrical output signals 32 which correspond to the channels (lambda) of the optical input signal. The module 24 includes a plurality of internal, integrated optical/electrical paths which are formed as integrated components on/in a common receiver circuit substrate 24*b*.

Transmitter module 26 is contained in a housing 26*a* and provides a multipath electrical interface for receipt of a plurality of electrical input signals 36 which in turn are each converted internally to an optical format, multiplexed and output to an optical output fiber 38. The integrated circuit 26 includes a plurality of internal, integrated electrical/optical paths which are formed as integrated components on/in a common transmitter circuit substrate 26*b*.

The electrical switching fabric 28 provides a remotely alterable electrical interface 40 to electrical layers of the network whereby one or more WDM channels can be added or dropped. The switch fabric 28 facilitates remote reconfiguration of the respective node in accordance with traffic requirements.

It will be understood that switch fabric 28 could be replaced with a plurality of hardwired electrical paths. In this embodiment, the network will not be reconfigurable.

Figure 2B:
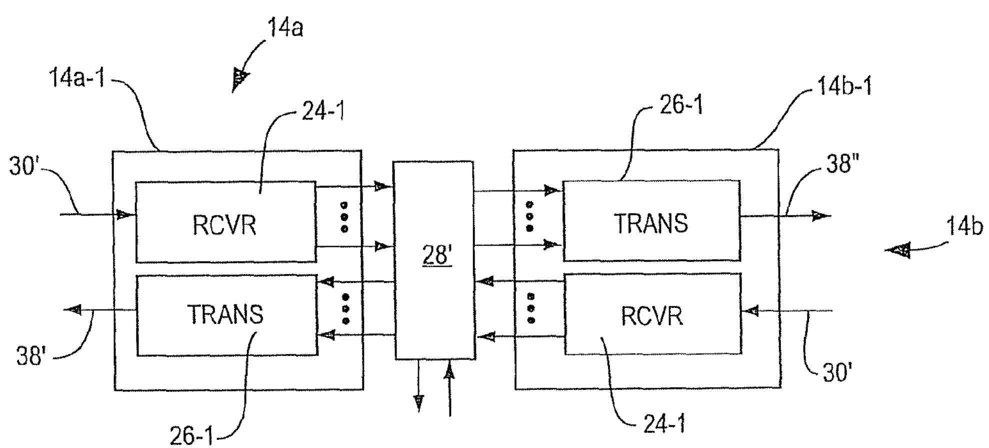
FIG. 2B illustrates an alternate embodiment of the add/drop multiplexer of FIG. 2A.

FIG. 2B illustrates integrated circuit transceivers 14*a, b* which can be identical. Each includes a receiver 24-1 and a transmitter 26-1, in accordance with receiver 24 and transmitter 26, in a respective package 14*a*-1, 14*b*-1. The transceivers 14*a, b* can be used as an alternate to receiver module 24 and transmitter module 26 to implement a bi-directional node, or to provide a single package implementation. Additionally, higher degree nodes in bi-directional networks, discussed subsequently, can be implemented using transceiver elements 14*a, b*.

Figure 3:
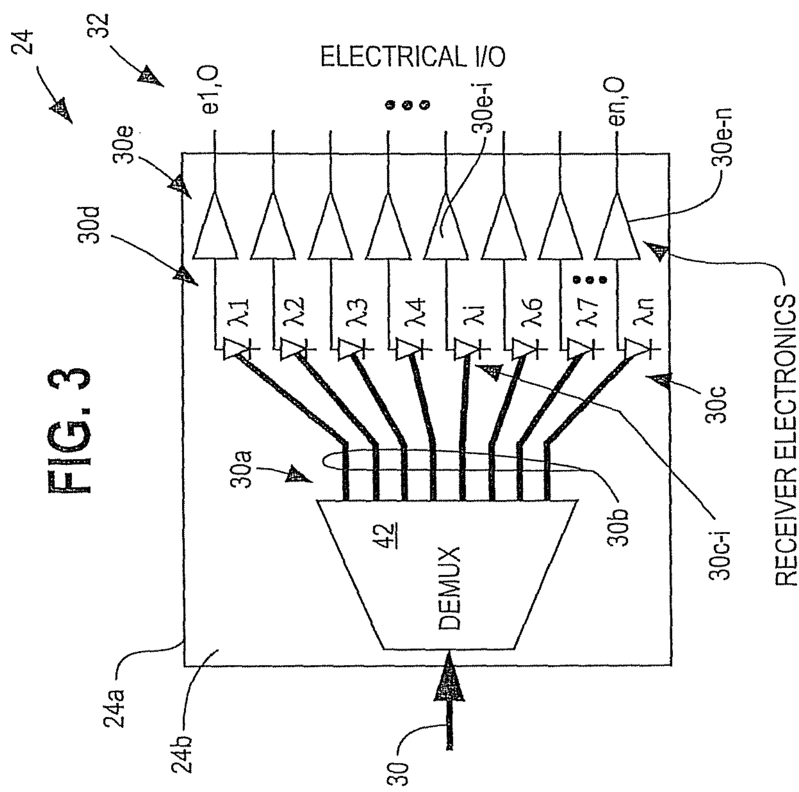
FIG. 3 illustrates details of an integrated receiver module usable in the add/drop multiplexer of FIG. 2A.

FIG. 3 illustrates details of integrated receiver module 24. It will be understood that a variety of known fabrication techniques can be used to implement receiver 24. Such details are not limitations of the present invention.

Receiver module 24 includes the substrate 24*b* which carries an optical wavelength demultiplexer 42 which converts for example, a WDM optical input signal on fiber 30 to a plurality 30*a* of information carrying output optical signals of differing wavelengths λ1, λ2 . . . λn. The members of the plurality of optical signals 30*a* are each coupled via respective members of a plurality of waveguides 30*b*, integrally formed on/in substrate 24*b* to respective members of a plurality of opto/electric converters 30*c*. The members of plurality 30*c*, which could be relatively inexpensive PIN photodiodes, are integrally formed on/in substrate 24*b*.

The parallel electrical outputs from the members of the plurality 30*c*, each an electrical representation of a demultiplexed WDM channel, are coupled via a plurality of conductive elements 30*d* integrally formed on/in substrate 24*b* to respective inputs of members of a plurality of gain or regeneration elements 30*e*.

Outputs from each photodiode, such as 30*c-i* are coupled to a respective amplifier element 30*e-i* which provides both reamplification and reshaping (2R regeneration) of the electrical representation of the electrical signal from respective converter 30*d-i*. It will be understood that a variety of amplifier structures are usable in receiver 24 without departing from the spirit and scope of the present invention. For example and without limitation, the members of the plurality 30*e* could each be integrally formed on/in substrate 24*b* as a transimpedance amplifier coupled in series with a limiting amplifier.

Outputs from receiver 24, a plurality of reamplified and reshaped electrical signals 32 can then be coupled to and switched via switching fabric 28 as discussed previously. Each optical channel, or wavelength, is reshaped electrically on a per channel basis avoiding known problems associated with mere amplification of a composite, WDM light beam.

One of the advantages of the configuration of receiver 24 is that the integrated combination of the multiplexer 42, optical waveguides 30*b*, converters 30*d* and amplifier circuitry 30*e* consolidate extensive connectivity into a single integrated circuit, This in turn reduces packaging costs, reduces the number of fiber interfaces, and reduces inventory costs. Additionally, because of being able to take advantage of highly sophisticated integrated circuit manufacturing techniques, modules, such as the receiver 24, can be expected to exhibit enhanced reliability and uniformity due to extensive reduction in discrete, manufactured connections.

Figure 4:
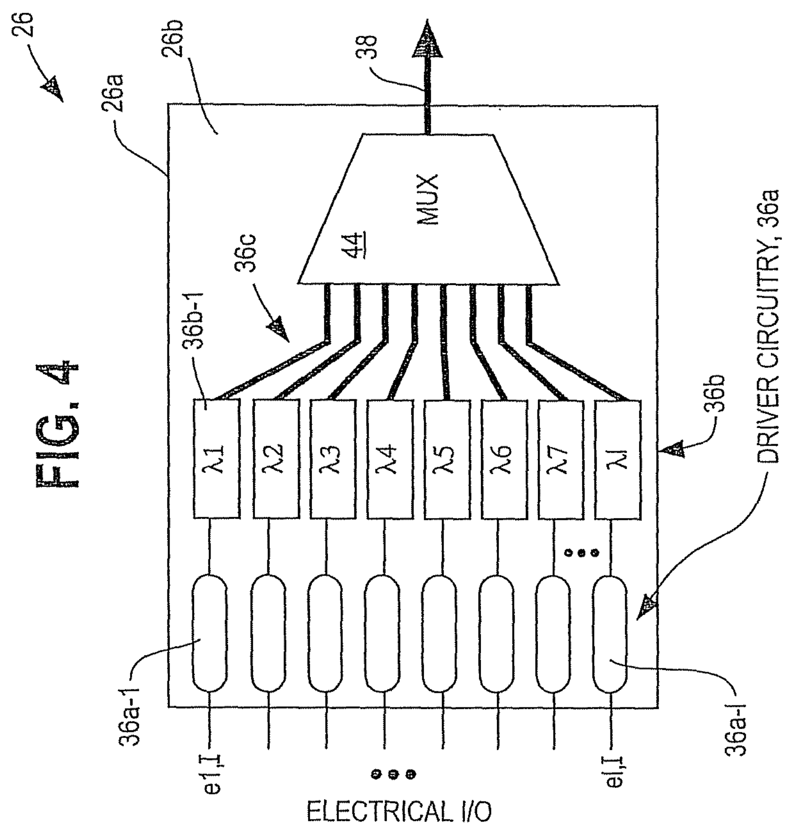
FIG. 4 illustrates details of integrated transmitter module usable in the add/drop multiplexer of FIG. 2A.

FIG. 4 illustrates details of the integrated/transmitter module 26. Transmitter module 26 incorporates a plurality of drive circuits 36*a*, one for each wavelength of interest, integrated on substrate 26*b* and a plurality of mono-chromatic sources, such as laser diodes or lasers, 36*b*. Each of the members of the plurality 36*a*, corresponding for example to 36*a*-1, is in turn coupled to a respective member of the plurality 36*b* such as the member 36*b*-1. In response to electrical input signals on the respective input such as input e1, I, the members of the plurality of lasers 36*b* emit modulated optical signals of appropriate wavelength, λ1, λ2 . . . λ1, which in turn are coupled by a plurality of waveguides 36*c*, integrated on/in substrate 26*b*, to integrated optical multiplexer 44. The composite optical signal output from multiplexer 44 is in turn coupled to optical fiber 38.

It will be understood that the members of the plurality of drive circuits 36*a* can be implemented with various configurations without departing from the spirit and scope of the present invention. Similarly, the sources 36*b* also can be implemented in various ways without departing from the spirit and scope of the present invention.

Where one or more receiver modules 24 is electrically coupled to one or more switching fabrics, such as switch 36, which is in turn coupled to one or more output modules 26, optical signals on fiber 30 can be passed through to fiber 38, or dropped via network 36. Signals can be added via network 36 to the composite optical signal on fiber 38. A variety of rates and data formats are simultaneously supportable by the configuration of FIG. 2A in view of the 2R regeneration. Additionally, the configuration of FIG. 2A is remotely configurable.

The configuration of FIG. 2A permits wavelength conversion. This results in flexibility in wavelength assignment, and elimination of wavelength blocking or stranded bandwidth. Additionally, signals exhibit uniform power levels given per channel electrical regeneration. Nodes can be added or deleted readily using the structure of FIG. 2A. Finally, the 2R regeneration provides for and supports protocol transparency. If desired, 3R regeneration, with reclocking could also be used without departing from the spirit and scope of the invention.

Figure 5:
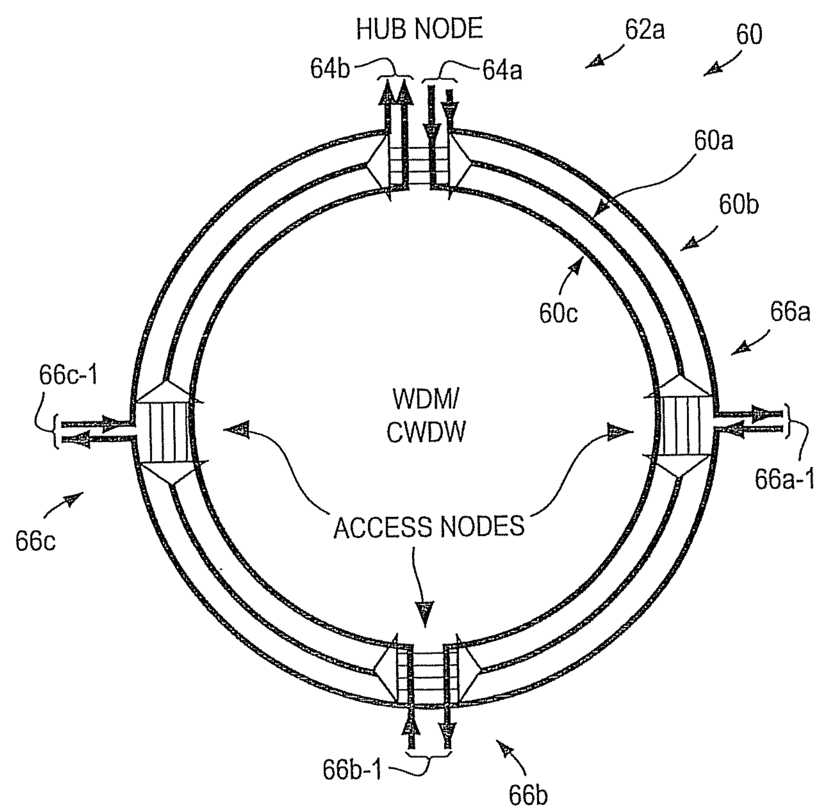
FIG. 5 illustrates a portion of an exemplary ring network which incorporates transceivers of a type illustrated in FIG. 2B.

FIG. 5 illustrates diagrammatically a portion of an exemplary ring-type network 60 which can incorporate one or more optical fibers 60*a*, in the ring for redundancy and back-up. Hub node 62*a*, which can be implemented with a pair of transceivers 14*a*, 14*b* as illustrated in FIG. 2B combined with an electronic switch, such as a crosspoint switch 28 can be used for the purpose of initiating and terminating optical signals on ring 60. In such event, electrical input/output port pairs 64*a, b* can be used for purposes of adding and dropping signals on ring 60.

A plurality of access nodes 66*a*, 66*b* and 66*c*, implemented using transceivers 14*a, b* can be coupled to the fiber 60*a*. In such event, for example add/drop multiplexers 66*a, c* coupled to fiber 60*a* could be used to add and drop selected wavelengths indicated as 60*b* transmitted by fiber 60*a* via respective add/drop ports 66*a*-1, and 66*c*-1. Similarly, access node 66*b* can be used to add/drop other wavelengths illustrated as 60*c* via add/drop port 66*b*-1. Other variations are possible.

Figure 6:
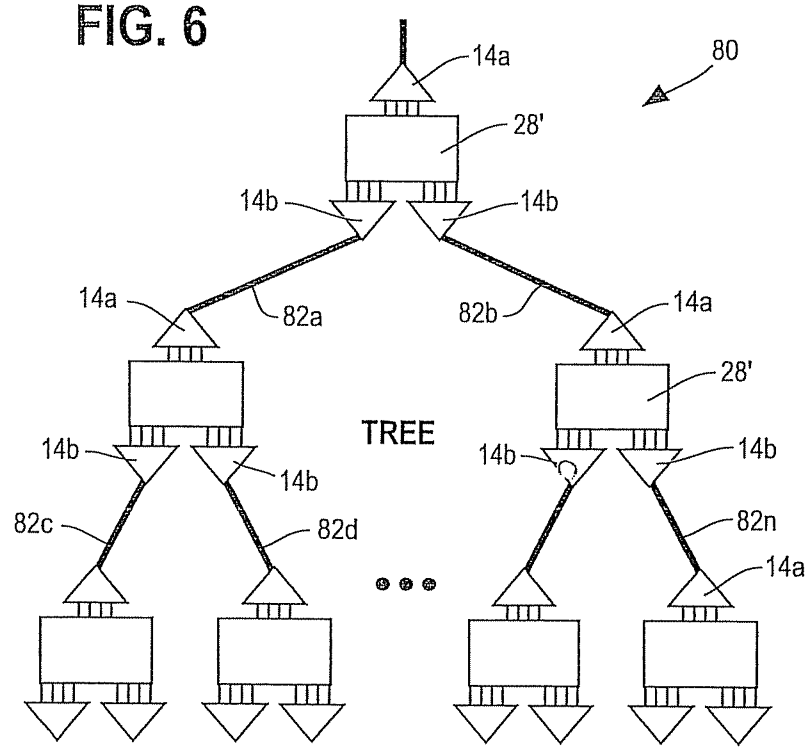
FIG. 6 illustrates a portion of an exemplary tree network formed of a plurality of nodes incorporating transceivers of a type illustrated in FIG. 2B.

FIG. 6 illustrates a portion of an exemplary tree network 80 implementable with network nodes which incorporate a crosspoint switch such switch 28' in combination with multiple identical transceiver modules 14*a* and 14*b*. The modules 14*a*, 14*b* can be linked via optical fibers such as the fibers 82*a*, 82*b*, 82*c*, 82*d* . . . 82*n*. It will be understood that a variety of tree configurations could be implemented using transceiver modules 14*a, b*, and associated switching element, such as switching element 28', without departing from the spirit and scope of the present invention. Using the switching elements 28', wavelengths can be routed to various nodes of network 80.

Figure 7:
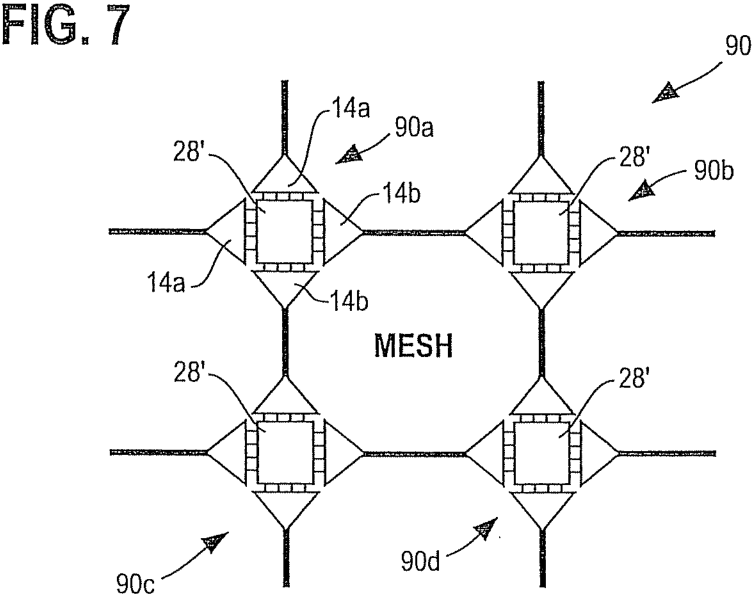
FIG. 7 illustrates a portion of an exemplary mesh network which incorporates transceivers of a type illustrated in FIG. 2B.

FIG. 7 illustrates a portion of an alternate multiple transceiver array network configuration 90 wherein a quad transceiver configuration is used to implement each of the network nodes such as nodes 90*a, b, c*, and *d*. Each of the nodes, such as the node 90*a*, can be implemented with four transceiver modules, such as the transceiver module 14*a* combined with a respective switch element, such as the switch element 28'. Using the switching elements 28', wavelengths can be routed to various nodes of network 90.

Those of skill will understand that in many wavelength division multiplex systems optical channel spacing has been standardized at 50 GHz, 100 GHz, and 200 GHz. Additionally, course wave division multiplexing (CWDM) is known wherein the channels are spaced on the order of 20 nanometers apart. It will be understood that all such spacings are compatible with and come within the scope of the present invention.

Figure 8B:
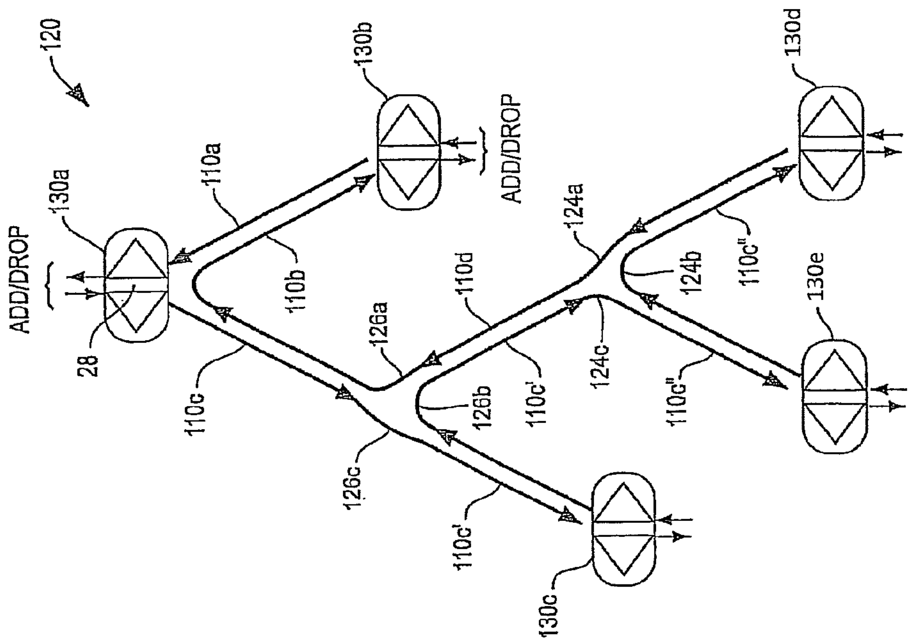
FIG. 8B illustrates a higher capacity, active, form of the network of FIG. 8A.
Figure 8A:
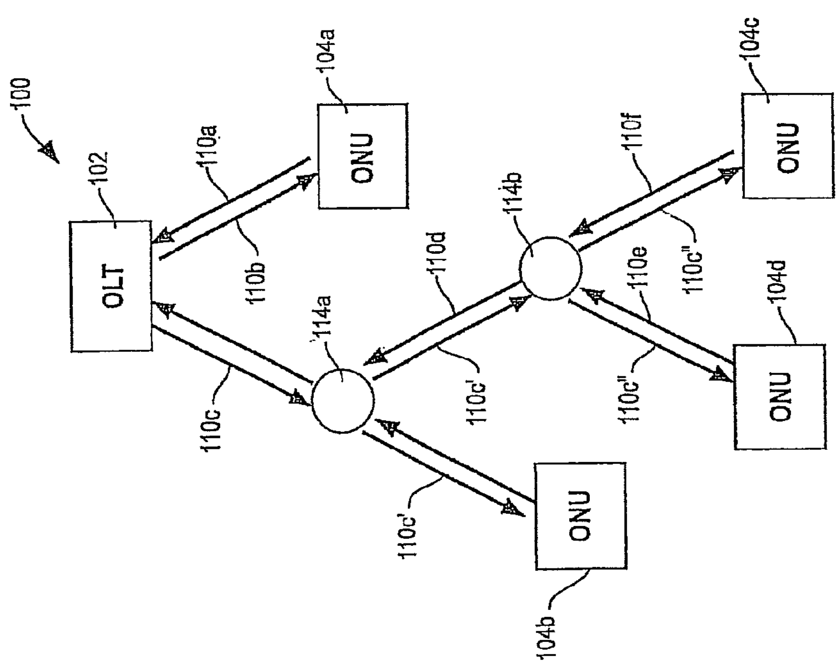
FIG. 8A illustrates a portion of a known passive optical network.

FIG. 8A illustrates a portion of a known form of passive optical network 100. Such networks as known to those of skill in the art are configured as tree networks with an optical line terminal 102 forming a base thereof. Optical networking units 104*a, b, c, d* form leaves, terminations, for the network 100.

The base and the leaves are interconnected by pairs of optical fibers, for example, optical fibers 110*a* and 110*b*. As known to those of skill in the art, in such networks, a single wavelength is transmitted unidirectionally in each optical fiber. The signals on a given optical fiber, such as fiber 110*c*, are split at passive optical splitters, such as splitters 114*a, b* into signals 110*c'*.

The passive nature of networks 100 limits both the information carrying capacity thereof as well as the geographical extent of such networks. However, the optical fibers supporting such networks have been installed and are an available resource.

FIG. 8B illustrates a portion of an up-graded, higher capacity version 120 of the network 100. The network 120, as discussed below, has the advantage that it can utilize existing installed fiber links such as the links 110*a, b, c, c'* and c".

In the network 120, the optical splitters 114*a, b* have been replaced by links of optical fiber 124*a, b, c* and 126*a, b, c*. These links join fibers, such as fibers 110*d, f* and 100*e, c"* which transmit signals in opposite directions relative to respective removed splitter 114*b*. This converts the network configuration 100 from a tree structure to a collapsed ring.

The passive optical network terminals and networking units 102, 104*a, b, c, d* are also replaced with optical add/drop multiplexer units, 130*a*, . . . *e* which could be implemented in the form of integrated receivers and transmitters 24, 26 combined with switch fabric 28, discussed previously. Alternately, the add/drop nodes 130*a, b*, . . . *e* could be implemented using discrete components. Each of the add/drop nodes, such as 130*a*, incorporates a reconfigurable switch fabric such as the point-to-point switch fabric 28 which provides add/drop functionality for signals being added to or dropped from the network.

The network 120, in addition to utilizing the existing installed fiber optic links can be operated as a multiple wavelength higher capacity network than is the case for the network 100. Additionally, the network 120 is reconfigurable by means of the reconfigurable switch fabrics 28. Finally, the use of active amplifier elements in the add/drop modules 130*a, b* . . . *e* makes it also possible to extend the geographical extent of the network 120 beyond that which is possible with passive network 100.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A wavelength division multiplexing communications system comprising:

a plurality of optical fibers; and a plurality of integrated, optical add/drop modules, wherein each of the plurality of integrated, optical add/drop modules includes at least one integrated receiver module embodied as an integrated circuit chip that carries an optical input, coupled to a respective optical fiber, and a plurality of electrical outputs, the integrated circuit chip incorporating a wavelength demultiplexer, optical detectors, and a plurality of amplifier elements integrated into the integrated circuit chip, wherein each of the plurality of integrated, optical add/drop modules includes an integrated transmitter module embodied as another integrated circuit chip that carries a plurality of electrical input ports and an optical output, the other integrated circuit chip incorporating a plurality of drive circuits, monochromatic optical sources, and a multiplexer integrated into the other integrated circuit chip, each of the plurality of drive circuits corresponding to a wavelength of interest and coupled to a respective one of the monochromatic optical sources, and the optical output coupled to a respective optical fiber, and wherein each of the integrated circuit chip and the other integrated circuit chip includes a plurality of waveguides integrally formed on a respective substrate, each of the plurality of waveguides integrally formed on the integrated circuit chip coupled to a respective one of the optical detectors, and each of the optical detectors coupled to an input of a respective one of the plurality of amplifier elements to reamplify and reshape information carrying electrical signals on a per wavelength basis; and a controllable electrical switching fabric for coupling some of the plurality of electrical outputs to some of the plurality of electrical input ports with signal input and output ports for inputting or outputting the information carrying electrical signals.

2. A wavelength division multiplexing communications system as in claim 1 wherein the plurality of optical fibers are configured in one of a mesh network, a tree network or a ring network.

3. A wavelength division multiplexing communications system as in claim 1 wherein the at least one integrated receiver module includes the wavelength demultiplexer coupled to the optical input at an input side and to some of the plurality of waveguides at a plurality of outputs with selected pairs of optical signals carried by respective ones of the plurality of waveguides optically spaced apart from one another a predetermined number of wavelengths.

4. A wavelength division multiplexing communications system as in claim 1 wherein the integrated transmitter module includes the multiplexer coupled to the optical output at an output side and to some of the plurality of waveguides at a plurality of outputs with selected pairs of optical signals carried by respective ones of the plurality of waveguides optically spaced apart from one another a predetermined number of wavelengths.

5. A wavelength division multiplexing communications system as in claim 1 wherein the controllable electrical switching fabric implements wavelength switching between the at least one integrated receiver module and the integrated transmitter module to minimize stranded bandwidth.

6. A wavelength division multiplexing communications system as in claim 1 wherein some of the plurality of integrated, optical add/drop modules include a common housing for pairs of the at least one integrated receiver module and the integrated transmitter module.

7. A collapsed ring network comprising:

a plurality of pairs of optical fibers, wherein members of one of the plurality of pairs of optical fibers transmit optical signals in opposite directions; and an add/drop node on opposing ends of each of the plurality of pairs of optical fibers, the add/drop node further comprising an integrated receiver module embodied as an integrated circuit chip, an integrated transmitter module embodied as another integrated circuit chip, and a controllable electrical switching fabric connecting the integrated receiver module and the transmitter module, wherein some of the plurality of pairs of optical fibers terminate at a respective add/drop node while others of the plurality of pairs of optical fibers are coupled via a corresponding add/drop node to selected ones of the plurality of pairs of optical fibers to link the others of the plurality of pairs of optical fibers and the selected ones of the plurality of pairs of optical fibers that are transmitting signals in a common direction, wherein the integrated circuit chip of the integrated receiver module includes a wavelength demultiplexer, a plurality of receiver module waveguides, a plurality of optical detectors, and a plurality of amplifier elements, the wavelength demultiplexer coupled to each of the plurality of receiver module waveguides, each of the plurality of receiver module waveguides coupled to a respective one of the plurality of optical detectors, and each of the plurality of optical detectors coupled to a respective one of the plurality of amplifier elements to reamplify and reshape electrical signals on a per wavelength basis, and wherein the another integrated circuit chip of the integrated transmitter module includes a plurality of drive circuits, a plurality of monochromatic optical sources, a plurality of transmitter module waveguides, and a multiplexer, each of the plurality of drive circuits corresponding to a wavelength of interest and coupled to a respective one of the plurality of monochromatic optical sources, each of the plurality of monochromatic optical sources coupled to a respective one of the plurality of transmitter module waveguides, and each of the plurality of transmitter module waveguides coupled to the multiplexer.

8. A collapsed ring network as in claim 7 wherein the add/drop node includes signal add/drop ports, and wherein added signals are circulated through the collapsed ring network to be dropped at the respective add/drop node.

* * * * *